United States Patent
Ly et al.

(10) Patent No.: US 11,503,652 B2
(45) Date of Patent: Nov. 15, 2022

(54) APPARATUS AND METHODS FOR SYNCHRONIZATION SIGNAL AND RANDOM ACCESS COMMUNICATIONS IN FULL DUPLEX

(71) Applicant: QUALCOMM Incorporated, San Diego, CA (US)

(72) Inventors: Hung Dinh Ly, San Diego, CA (US); June Namgoong, San Diego, CA (US); Shimman Arvind Patel, San Diego, CA (US); Krishna Kiran Mukkavilli, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/011,756

(22) Filed: Sep. 3, 2020

(65) Prior Publication Data
US 2021/0100038 A1 Apr. 1, 2021

Related U.S. Application Data

(60) Provisional application No. 62/908,193, filed on Sep. 30, 2019.

(51) Int. Cl.
*H04W 74/08* (2009.01)
*H04L 5/14* (2006.01)
*H04L 27/26* (2006.01)
*H04W 56/00* (2009.01)
*H04L 5/00* (2006.01)

(52) U.S. Cl.
CPC .......... *H04W 74/0833* (2013.01); *H04L 5/14* (2013.01); *H04L 27/2607* (2013.01); *H04W 56/001* (2013.01); *H04L 5/001* (2013.01)

(58) Field of Classification Search
CPC .......... H04W 74/0833; H04W 56/001; H04W 76/10; H04W 74/0808; H04W 74/002; H04W 74/02; H04W 76/11; H04W 72/0453; H04L 5/14; H04L 27/2607; H04L 5/001; H04L 5/0094; H04L 5/0053; H04L 5/0098; H04B 7/18506
See application file for complete search history.

(56) References Cited

U.S. PATENT DOCUMENTS

2018/0278291 A1* 9/2018 Liu ................. H04L 5/0094
2018/0368189 A1* 12/2018 Narasimha .......... H04W 56/001
(Continued)

FOREIGN PATENT DOCUMENTS

WO   2019099443 A1   5/2019
WO   WO-2019099443 A1 * 5/2019 ........... H04L 5/0048

OTHER PUBLICATIONS

International Search Report and Written Opinion—PCT/US2020/0494706—ISA/EPO—dated Dec. 7, 2020.

*Primary Examiner* — Hardikkumar D Patel

(57) ABSTRACT

Aspects described herein relate to determining that a time division is for receiving a synchronization signal block (SSB) and for a random access occasion (RO) for transmitting a random access preamble in full duplex (FD) communications, and based on the determining, at least one of receiving the SSB or transmitting the random access preamble in the RO during the time division.

28 Claims, 9 Drawing Sheets

(56) References Cited

U.S. PATENT DOCUMENTS

| | | | |
|---|---|---|---|
| 2019/0149365 A1* | 5/2019 | Chatterjee | H04L 5/0044 |
| | | | 370/329 |
| 2019/0208550 A1 | 7/2019 | Ko et al. | |
| 2019/0327766 A1* | 10/2019 | Zhang | H04L 27/261 |
| 2020/0389282 A1* | 12/2020 | Turtinen | H04L 5/0092 |
| 2021/0068161 A1* | 3/2021 | Takahashi | H04W 74/0833 |

* cited by examiner

APPARATUS AND METHODS FOR SYNCHRONIZATION SIGNAL AND RANDOM ACCESS COMMUNICATIONS IN FULL DUPLEX

CLAIM OF PRIORITY UNDER 35 U.S.C. § 119

The present Applications for patent claims priority to U.S. Provisional Patent Application No. 62/908,193, entitled "TECHNIQUES FOR SYNCHRONIZATION SIGNAL AND RANDOM ACCESS COMMUNICATIONS IN FULL DUPLEX" filed Sep. 30, 2019, which is assigned to the assignee hereof and hereby expressly incorporated by reference herein for all purposes.

BACKGROUND

Aspects of the present disclosure relate generally to wireless communication systems, and more particularly, to communicating certain signals in full duplex wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) and/or an access point can be configured for full duplex (FD) communications where the UE and/or access point can concurrently transmit and receive over wireless communication resources within the same frequency band or the same component carrier. In addition, user equipment (UE) can perform a random access procedure to initiate establishing a connection with an access point for receiving access to a wireless network. Access points can also be configured to transmit synchronization signal blocks (SSBs) to UEs to allow the UEs to synchronize timing with the access point and/or determine a beam with desirable properties for receiving communications from, and/or transmitting communications to, the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes determining that a time division is for receiving a synchronization signal block (SSB) and for a random access occasion (RO) for transmitting a random access preamble in full duplex (FD) communications, and based on the determining, at least one of receiving the SSB or transmitting the random access preamble in the RO during the time division.

In another aspect, a method of wireless communication is provided that includes determining that a time division is for receiving a synchronization signal block (SSB) and for a random access occasion (RO) for transmitting a random access preamble in full duplex (FD) communications, and based on the determining, at least one of transmitting the SSB or receiving the random access preamble in the RO during the time division.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods and aspects described above and further herein. In another aspect, an apparatus for wireless communication is provided that includes means for performing the operations of methods and aspects described above and further herein. In yet another aspect, a computer-readable medium is provided including code executable by one or more processors to perform the operations of methods and aspects described above and further herein.

In an aspect, an apparatus for wireless communication is provided that includes a transceiver, a memory configured to store instructions, and one or more processors communicatively coupled with the transceiver and the memory. The one or more processors are configured to determine that a time division is for receiving a SSB and for a RO for transmitting a random access preamble in FD communications, and based on the determining, at least one of receive the SSB or transmit the random access preamble in the RO during the time division.

In another aspect, an apparatus for wireless communication is provided that includes determining that a time division is for receiving a synchronization signal block (SSB) and for a random access occasion (RO) for transmitting a random access preamble in full duplex (FD) communications, and based on the determining, at least one of receiving the SSB or transmitting the random access preamble in the RO during the time division.

In another aspect, a computer-readable medium including code executable by one or more processors for wireless communications is provided. The code includes code for determining that a time division is for receiving a synchronization signal block (SSB) and for a random access occasion (RO) for transmitting a random access preamble in full duplex (FD) communications, and based on the determining, at least one of receiving the SSB or transmitting the random access preamble in the RO during the time division To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
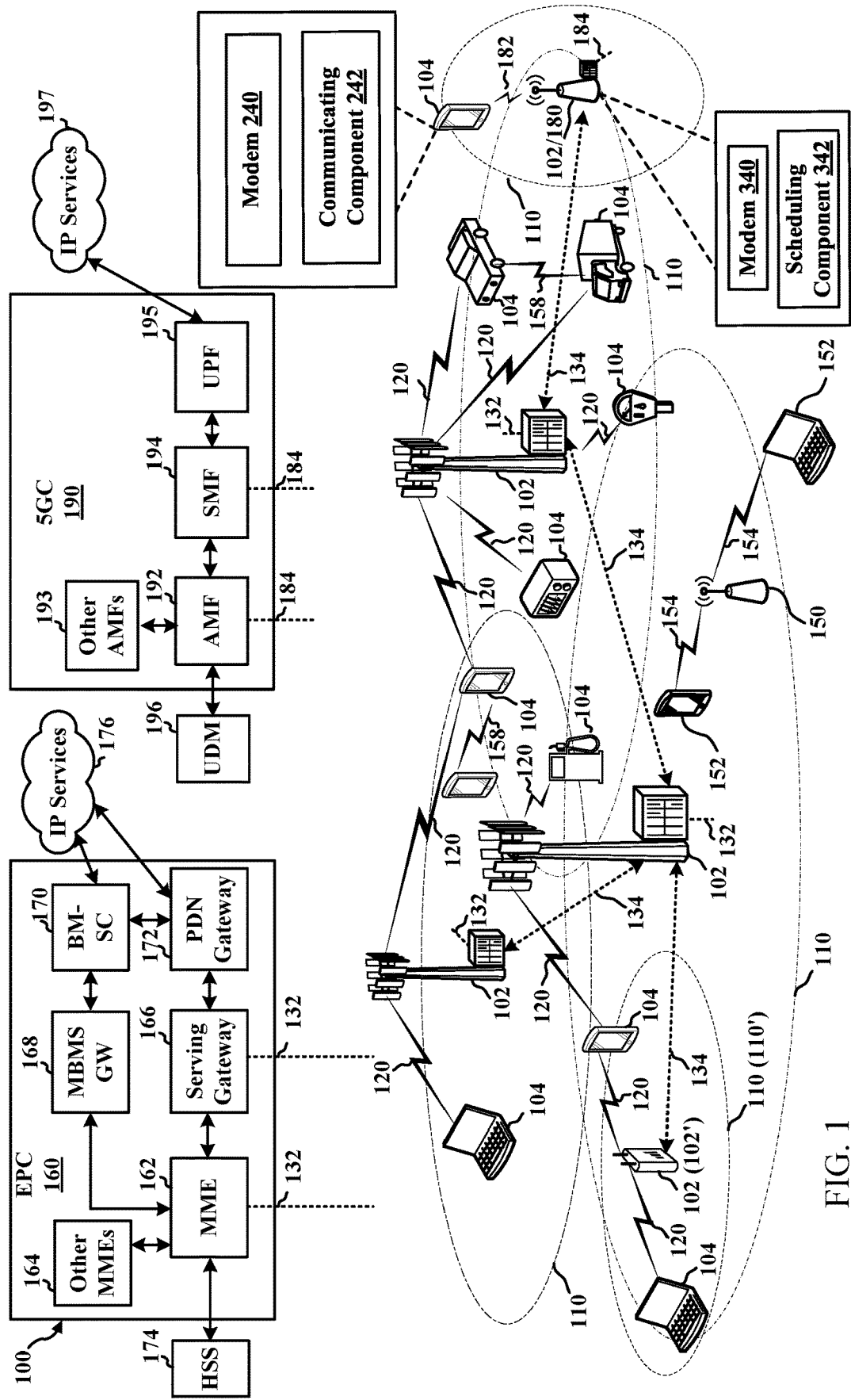
FIG. 1 illustrates an aspect of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to allowing concurrent communication of synchronization signals on one link and communication of a random access message on another link in full duplex (FD) communications. In an aspect, the concurrent communication can include an access point (e.g., a base station) transmitting the synchronization signals on a downlink and a user equipment (UE) receiving the synchronization signals on the downlink as well as the UE transmitting a random access message on an uplink and the access point receiving the random access message on the uplink. In an aspect, a time division, such as a symbol (e.g., an orthogonal frequency division multiplexing (OFDM) symbol), a slot of multiple symbols, a subframe of multiple slots, etc., can be determined to allow for concurrent transmission of synchronization signals (e.g., on a downlink from an access point to a UE) and random access occasions (ROs) for transmitting random access messages (e.g., on an uplink from the UE to the access point). In such time divisions, an access point can transmit a synchronization signal (e.g., a synchronization signal block (SSB)) and/or a UE can transmit a random access message during the RO, where the transmissions may be concurrent within the time division. In one aspect, the access point can determine to transmit the synchronization signal and/or the UE can determine to transmit the random access message based on determining that the time division is of a type over which transmission of the synchronization signal and ROs are allowed in FD communications. A time division, as described herein, can include a time interval, which may have a duration corresponding to a symbols, multiple symbols, a slot of symbols, multiple slots, a subframe, etc.

FD communications, as referred to herein, can include a single node (e.g., a user equipment (UE) or access point) transmitting and receiving (e.g., concurrently) over communication resources in the same frequency band and/or over communication resources in the same component carrier (CC). In one aspect, FD communications can include in-band full duplex (IBFD) where the single node can transmit and receive on the same time and frequency resource, and the downlink and uplink can share the same IBFD time/frequency resources (e.g., full and/or partial overlap). In another aspect, FD communications can include sub-band FD (also referred to as "flexible duplex") where the single node can transmit and receive at the same time but on different frequency resources within the same frequency band (or over communication resources in the same CC), where the downlink resource and the uplink resources can be separated in the frequency domain (e.g., by a guard band). In an aspect, the guard band in sub-band FD can be on the order of resource block (RB) widths (e.g., 180 kilohertz (KHz) for third generation partnership project (3GPP) long term evolution (LTE) and fifth generation (5G) new radio (NR), 360 and 720 KHz for NR, etc.). This can be distinguished from a guard band in frequency division duplexing (FDD) communications defined in LTE and NR, which can be 5 megahertz (MHz) or more, and the associated resources in FDD are defined between frequency bands, but not within the same frequency band (or resources in the same CC) as is the case in sub-band FD communications.

In some aspects of FD communications, various antenna configurations can be used within a device (e.g., an access point or UE) to facilitate FD communications. In one configuration, a transmit antenna array can be spatially separated from a receive antenna array within the device to reduce leakage (e.g., self-interference) from the transmit antenna array into the receive antenna array. In another aspect, the antenna array configuration of non-FD communications can use the same antenna array(s) for transmitting or receiving (but not both).

Moreover, a random access procedure can refer to a random access channel (RACH) procedure as defined in LTE and/or NR, such as a four-step RACH procedure, a two-step RACH procedure, etc. In an aspect, a four-step RACH procedure can include a UE transmitting a first message (MSG1) over a physical RACH (PRACH) physical layer (PHY) channel, where the first message can include a PRACH preamble transmitted in a configured RACH occasion. The four-step RACH procedure can include an access point transmitting a second message (MSG2), in response to MSG1, over a physical downlink control channel (PDCCH) or physical downlink shared channel (PDSCH) as a random access response (RAR) including a timing advance, an uplink grant for a third message (MSG3), a temporary cell radio network temporary identifier (TC-RNTI), etc. The four-step RACH procedure can include the UE transmitting a third message (MSG3), in response to MSG2, over a physical uplink shared channel (PUSCH) including a radio resource control (RRC) connection request, a scheduling request, a buffer status, etc. The four-step RACH procedure can include the access point transmitting a fourth message (MSG4), in response to MSG3, over PDCCH or PDSCH including a contention resolution message. In another aspect, a two-step RACH procedure can include the UE transmitting a first message (MSG-A) that can include a RACH preamble and PUSCH payload, and the access point transmitting a second message (MSG-B), in response to MSG-A, including RAR and/or contention resolution message.

In addition, in an aspect, the UE can be configured to use RACH in various cases, such as in requesting initial access with the access point, transitioning from one RRC state to another with the access point (e.g., from RRC IDLE/INACTIVE to RRC CONNECTED), performing RACH to a target cell during handover, transmitting small uplink data in RRC IDLE/INACTIVE without necessarily transitioning to RRC CONNECTED, performing beam failure recovery, etc.

Also, in NR, an access point can transmit SSBs to facilitate discovery of the access point and/or determining beams to use for transmitting communications to and/or receiving communications from the access point. In an aspect, a SSB can include a synchronization signal (SS), such as a primary synchronization signal (PSS), secondary synchronization signal (SSS), etc., and/or a physical broadcast channel (PBCH) and/or related communications. In addition, synchronization signals, as described herein, may include any type of synchronization signal, a SSB that can include a SS/PBCH block of signals, and/or the like. In an aspect, the access point can transmit SSBs using various beams that are beamformed using different properties of multiple antenna resources to provide a directionality for the beams. The UE can receive the SSBs from the access point, and can determine which beam is optimal for communicating with the access point. The UE can indicate the determined beam to the access point and/or can use the beam in beamforming communications to be transmitted by the UE to the access point. In NR, the terms SSB and SS/PBCH block can be used interchangeably. In addition, though SSBs are described throughout, the concepts described herein may be applied to other sets of one or more synchronization signals that may be transmitted by an access point.

Currently, in NR, SSB and ROs are time division multiplexed. Aspects described herein relate to introducing integrated SSB/RO time divisions in FD communications. In an aspect, for FD communication within a frequency band or a CC, SSB and RO resources can exist in the same time, which can significantly reduce the time footprint and/or provide a more efficient system.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an aspect of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an aspect, the base stations 102 may also include gNBs 180, as described further herein. In one aspect, some nodes of the wireless communication system may have a modem 240 and communicating component 242 for determining a time division for a RO and for receiving a SSB in FD communications, as described herein. In addition, some nodes may have a modem 340 and scheduling component 342 for determining and/or scheduling a time division for a RO and for transmitting a SSB in FD communications, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another aspect, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3

GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range, where the base station 180 and/or the UE 104 can beamform antenna resources to transmit and/or receive signals based on beams determined, by the base station 180 and/or the UE 104, to be desirable. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an aspect, communicating component 242 can determine whether a time division (e.g., a symbol, slot of symbols, subframe of slots, etc.) is for integrated RO and SSB communication, and can accordingly transmit a random access preamble during the RO to a base station 102 and/or receive a SSB from the base station 102 in the time division. In an aspect, communicating component 242 can determine whether the time division is for RO and SSB communication based on an implicit determination using parameters of the time division (e.g., subframe number (SFN) or other index), an explicit determination based on an indication received from a base station 102, etc. In addition, in an aspect, scheduling component 342 can determine whether a time division (e.g., a symbol, slot of symbols, subframe of slots, etc.) is for integrated RO and SSB communication, and can accordingly transmit a SSB to a UE 104 and/or receive a random access preamble during the RO from the UE 104 in the time division. In an aspect, scheduling component 342 may indicate which time divisions are for RO and SSB.

Figure 2:
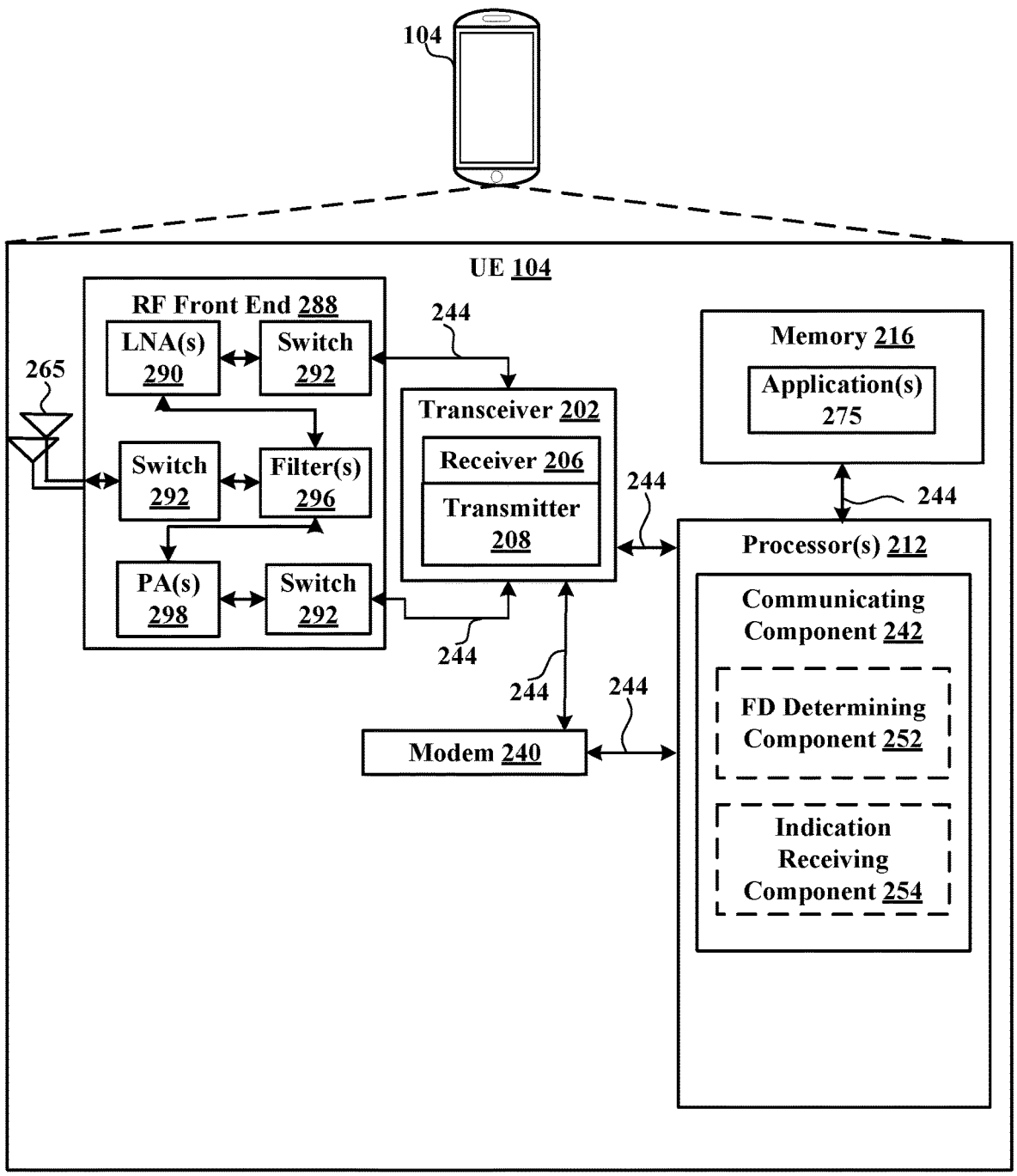
FIG. 2 is a block diagram illustrating an aspect of a UE, in accordance with various aspects of the present disclosure.
Figure 3:
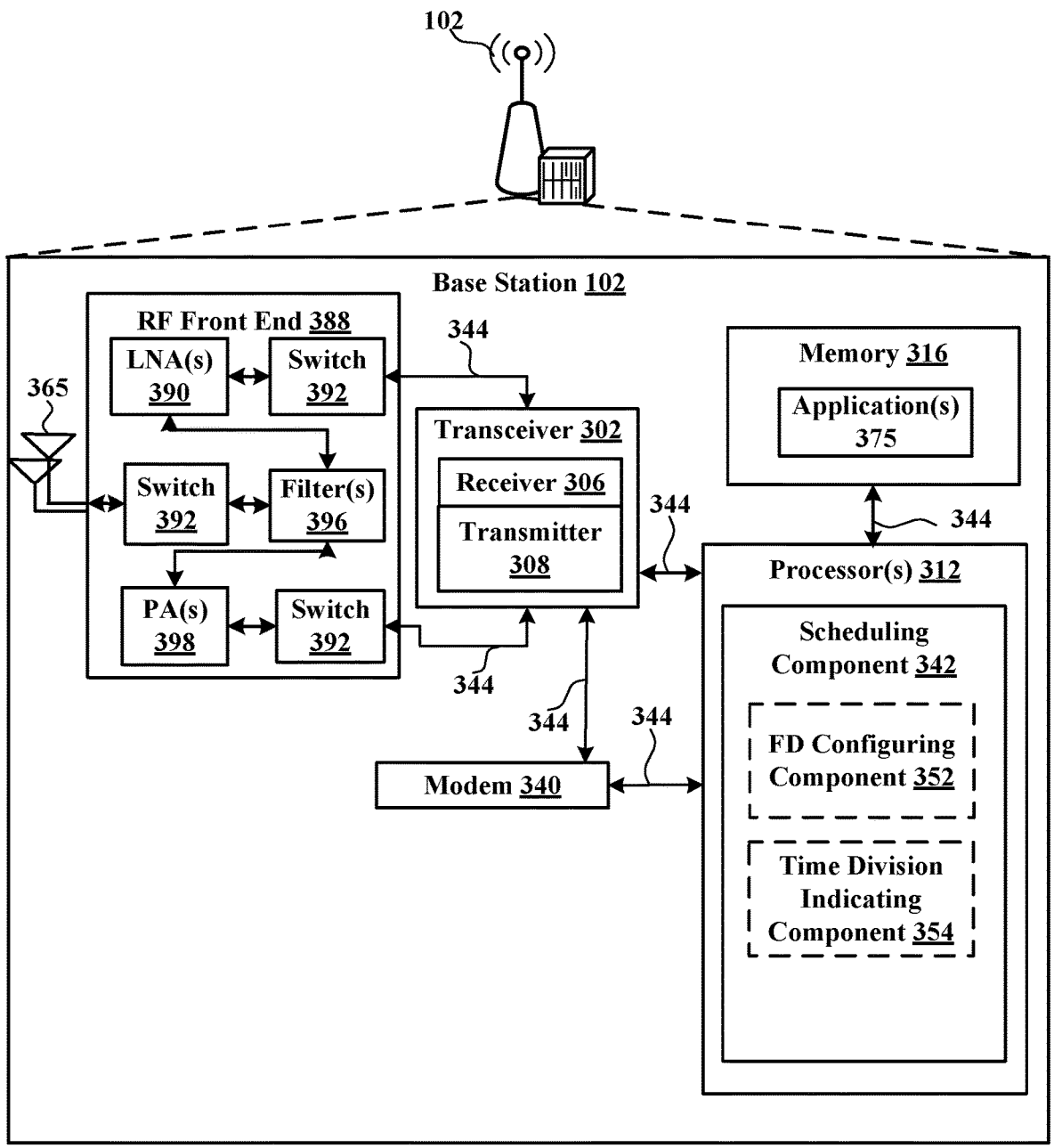
FIG. 3 is a block diagram illustrating an aspect of a base station, in accordance with various aspects of the present disclosure.
Figure 4:
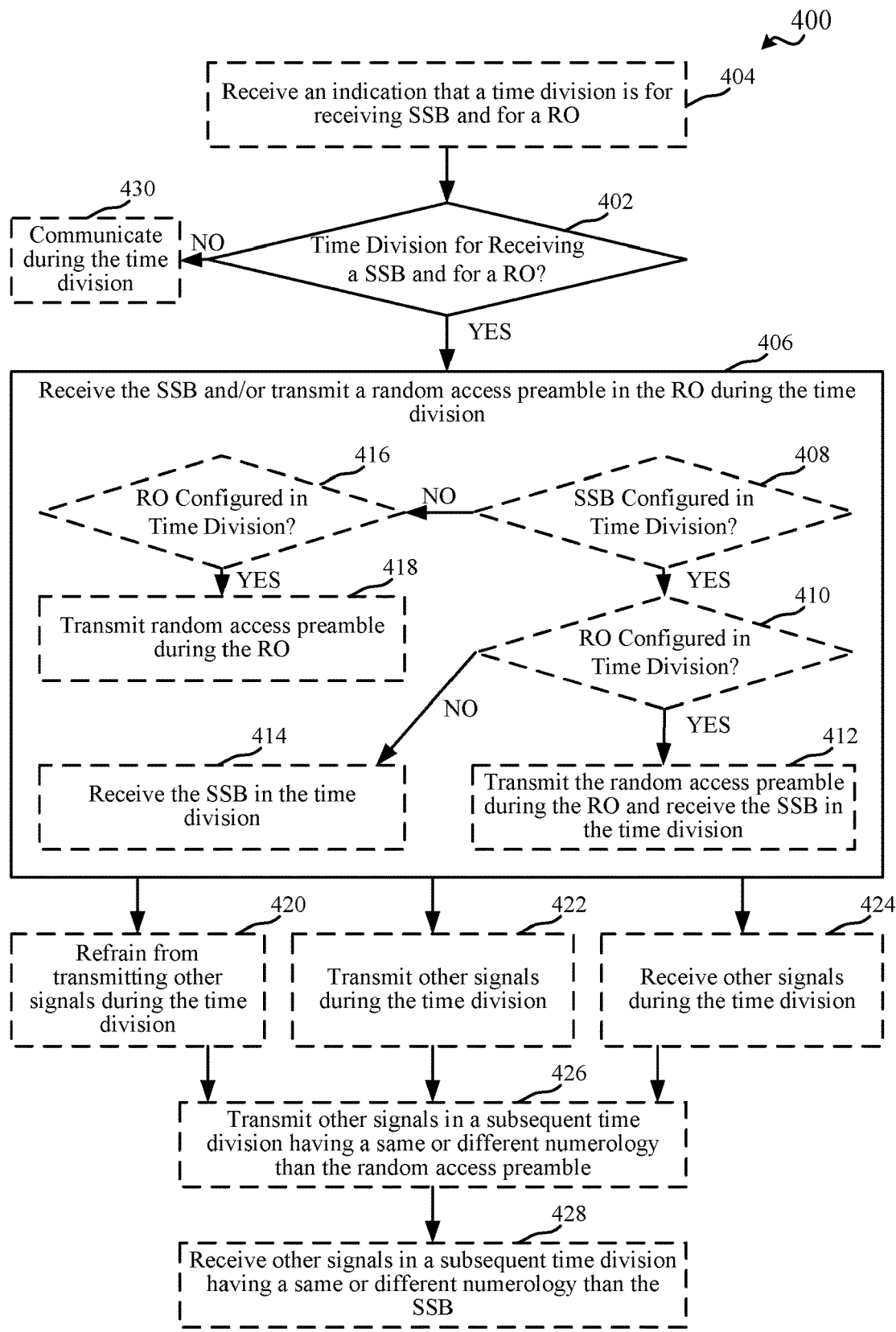
FIG. 4 is a flow chart illustrating an aspect of a method for receiving a synchronization signal block (SSB) and/or transmitting a random access preamble in the same time division, in accordance with various aspects of the present disclosure.
Figure 5:
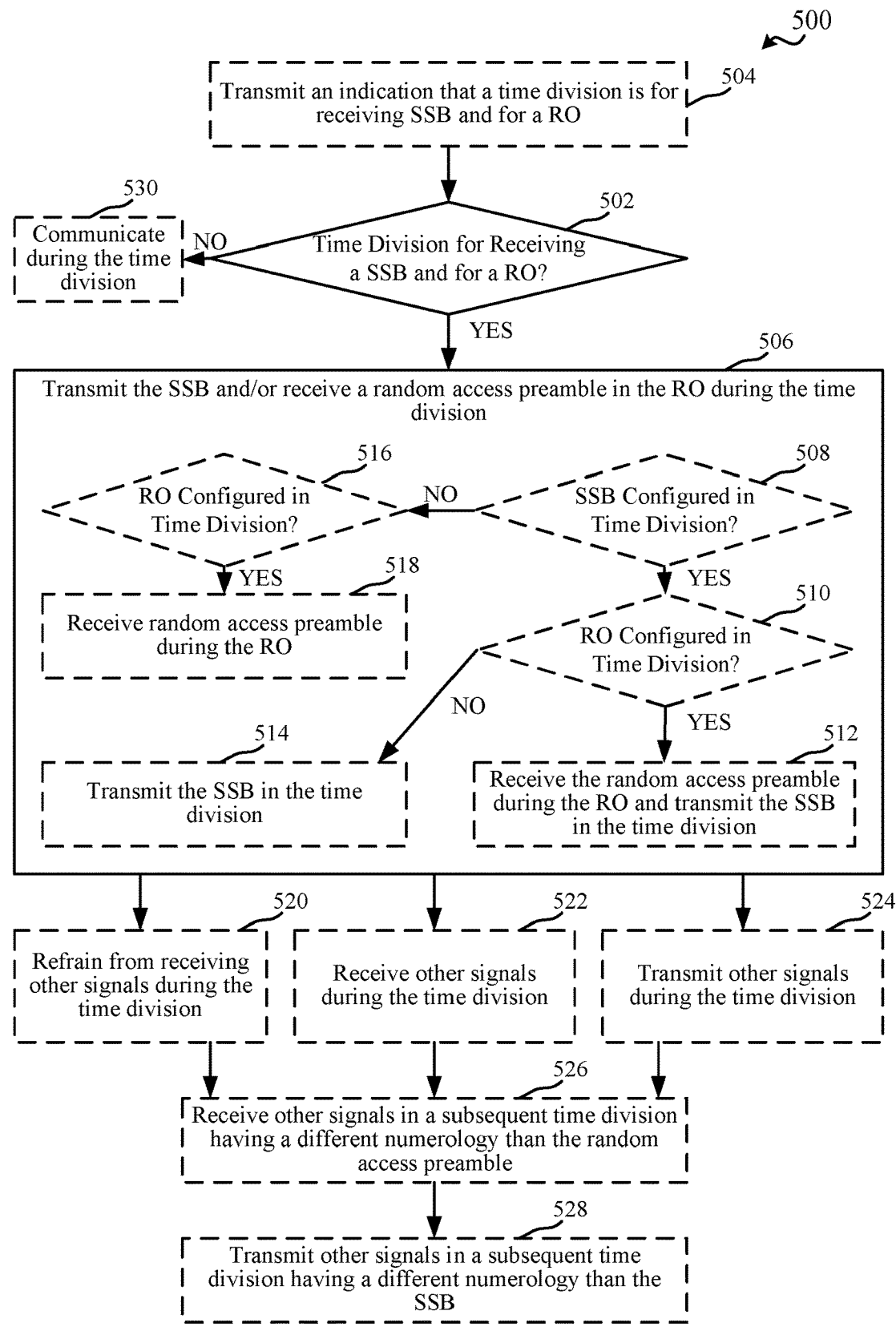
FIG. 5 is a flow chart illustrating an aspect of a method for transmitting a synchronization signal block (SSB) and/or receiving a random access preamble in the same time division, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one aspect of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining a time interval for a RO and for receiving a SSB, and accordingly transmitting a random access preamble during the RO or receiving the SSB in the time division, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. In an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, in an aspect, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, in an aspect, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, in an aspect, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, in an aspect, one or more filters 296 can be used by RF front end 288 to filter a received signal to obtain an input RF signal. Similarly, in an aspect, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, in an aspect, one or more base stations 102 or one or more cells associated with one or more base stations 102. In an aspect, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a FD determining component 252 for determining whether to transmit a random access preamble in a RO and/or receive a SSB from a base station in a given time division using FD communications, and/or an indication receiving component 254 for receiving an indication of a time division that is provided for both RO and SSB transmission, as described herein.

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one aspect of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring FD communications and/or resources for performing random access procedures, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a FD configuring component 352 for configuring FD communications by the base station 102 or one or more UEs 104 over certain resources, and/or a random access communicating component 354 for communicating one or more messages in a random access procedure based on whether FD communications are configured over the random access resources.

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an aspect of a method 400 for transmitting a random access preamble and/or receiving a SSB based on determining whether a corresponding time division is for both RO and receiving SSB. FIG. 5 illustrates a flow chart of an aspect of a method 500 for transmitting a SSB and/or receiving a random access preamble based on whether a corresponding time division is for both RO and receiving SSB. Methods 400 and 500 are described in conjunction with one another for ease of explanation, though the methods 400 and 500 are not required to be performed in conjunction. In an aspect, a UE 104 can perform the functions described in method 400 using one or more of the components described in FIGS. 1 and 2 and/or a base station 102 and/or other network component can perform the functions described in method 500 using one or more of the components described in FIGS. 1 and 3.

In method 400, at Block 402, it can be determined whether a time division is for receiving a SSB and for RO. In an aspect, FD determining component 252, e.g., in conjunction with processor(s) 212, memory 216, transceiver 202, communicating component 242, etc., can determine whether a time division is for receiving a SSB and for RO. In an aspect, the time division can be a symbol, a slot of symbols, a subframe of slots, etc., and the time division can be a current or future time division over which communicating component 242 determines to receive a SSB or transmit a random access preamble in an RO. In an aspect, this can be based on a configuration received from the base station 102, where the configuration may include a configuration of ROs, a configuration indicating timing (e.g., periodicity) of transmitting SSBs, etc., and the ROs and SSB transmissions may at least partially overlap in time. In an aspect, the base station 102 can transmit the configuration(s) using system information (SI) or other broadcast, radio resource control (RRC) signaling, downlink control information (DCI), etc. Thus, in one aspect, based on such configuration(s) and a parameter of the time division (e.g., SFN or other index), FD determining component 252 can determine whether the time division is for receiving a SSB and for RO.

In method 500, at Block 502, it can be determined whether a time division is for receiving a SSB and for RO. In an aspect, FD configuring component 352, e.g., in conjunction with processor(s) 312, memory 316, transceiver 302, scheduling component 342, etc., can determine whether a time division is for receiving a SSB and for RO. In an aspect, the time division can be a symbol, a slot of symbols, a subframe of slots, etc., and the time division can be a current or future time division over which scheduling component 342 can schedule SSB transmission and/or an RO. In an aspect, this can be based on a configuration generated and/or transmitted by base station 102, where the configuration may include a configuration of ROs, a configuration indicating timing (e.g., periodicity) of transmitting SSBs, etc., and the ROs and SSB transmissions may at least partially overlap in time. In an aspect, the base station 102 can transmit the configuration(s) using SI or other broadcast, RRC signaling, DCI, etc., as described. In an aspect, FD configuring component 352 can determine whether the time division is for receiving a SSB and for RO based on whether it has configured SSB and RO in the time division or not.

In method 400, optionally at Block 404, an indication that a time division is for receiving SSB and for RO can be received. In an aspect, indication receiving component 254, e.g., in conjunction with processor(s) 212, memory 216, transceiver 202, communicating component 242, etc., can receive the indication that the time division is for receiving SSB and for RO. In an aspect, indication receiving component 254 can receive the indication from the base station 102 (e.g., the base station that may transmit the SSB and/or provides configurations for the SSB and RO). In addition, in an aspect, indication receiving component 254 can receive the indication in a configuration, which may be transmitted by the base station using SI, RRC signaling, DCI, etc. The indication may indicate explicit time divisions that are configured for SSB and for RO, or parameters for determining which time divisions are configured for SSB and for RO (e.g., a periodicity of such time divisions, such as a periodicity of symbols, etc.).

In method 500, optionally at Block 504, an indication that a time division is for receiving SSB and for RO can be transmitted. In an aspect, time division indicating component 354, e.g., in conjunction with processor(s) 312, memory 316, transceiver 302, scheduling component 342, etc., can transmit the indication that the time division is for receiving SSB and for RO. In an aspect, time division indicating component 354 can transmit the indication to one or more UEs 104. In addition, in an aspect, time division indicating component 354 can transmit the indication in a configuration, which may be transmitted by the base station using SI, RRC signaling, DCI, etc. The indication may indicate explicit time divisions that are configured for SSB and for RO, or parameters for determining which time divisions are configured for SSB and for RO (e.g., a periodicity of such time divisions, etc.).

Where it is determined that the time division is for receiving the SSB and for RO at Block 402, at Block 406, during the time division, the SSB can be received and/or a random access preamble can be transmitted in the RO. In an aspect, FD determining component 252, e.g., in conjunction with processor(s) 212, memory 216, transceiver 202, communicating component 242, etc., can receive the SSB and/or transmit the random access preamble in the RO during the time division. In an aspect, FD determining component 252 can receive the SSB (e.g., from a base station 102) and transmit the random access preamble (e.g., to the base station 102) using FD communications. In another aspect, only one of the SSB transmission or the RO may be configured in the time division (though the time division may be indicated or otherwise determined as for receiving SSB and RO), in which case FD determining component 252 may receive the SSB or transmit the random access preamble, but not both.

In an aspect, in receiving the SSB and/or transmitting the random access preamble at Block 406, optionally at Block 408, it can be determined whether a SSB is configured in the time division. In an aspect, FD determining component 252, e.g., in conjunction with processor(s) 212, memory 216, transceiver 202, communicating component 242, etc., can determine whether the SSB is configured in the time division. In an aspect, FD determining component 252 can determine whether the SSB is configured in the time division based on a configuration received (e.g., from the base station 102) that indicates when SSBs are transmitted.

Where there is a SSB configured in the time division at Block 408, optionally at Block 410, it can be determined whether there is a RO configured in the time division. In an aspect, FD determining component 252, e.g., in conjunction with processor(s) 212, memory 216, transceiver 202, communicating component 242, etc., can determine whether the RO is configured in the time division. In an aspect, FD determining component 252 can determine whether the RO is configured in the time division based on a configuration received (e.g., from the base station 102) that indicates ROs and/or related random access preambles that can be transmitted in the ROs. In another aspect, FD determining component 252 can determine whether the RO is configured based on determining whether FD determining component 252 plans to transmit a random access preamble in the RO to perform a random access procedure. In an aspect, the UE 104 can determine to transmit a random access preamble in the RO based on determining to perform a random access procedure and based on determining possible ROs for initiating the random access procedure by transmitting the random access preamble.

Where there is a RO configured in the time division at Block 410, optionally at Block 412, the random access preamble can be transmitted during the RO and the SSB can be received in the time division. In an aspect, FD determining component 252, e.g., in conjunction with processor(s) 212, memory 216, transceiver 202, communicating component 242, etc., can transmit the random access preamble during the RO and receive the SSB in the time division (e.g., using FD communications).

Where there is not a RO configured in the time division at Block 410, optionally at Block 414, the SSB can be received in the time division. In an aspect, FD determining component 252, e.g., in conjunction with processor(s) 212, memory 216, transceiver 202, communicating component 242, etc., can receive the SSB in the time division without transmitting the random access preamble.

Where there is not a SSB configured in the time division at Block 408, optionally at Block 416, it can be determined whether there is a RO configured in the time division. In an aspect, FD determining component 252, e.g., in conjunction with processor(s) 212, memory 216, transceiver 202, communicating component 242, etc., can determine whether the RO is configured in the time division. In an aspect, FD determining component 252 can determine whether the RO is configured in the time division based on a configuration received (e.g., from the base station 102) that indicates ROs and/or related random access preambles that can be transmitted in the ROs. In another aspect, FD determining component 252 can determine whether the RO is configured based on determining whether FD determining component 252 plans to transmit a random access preamble in the RO to perform a random access procedure.

Where there is a RO configured in the time division at Block 416, optionally at Block 418, the random access preamble can be transmitted during the RO. In an aspect, FD determining component 252, e.g., in conjunction with processor(s) 212, memory 216, transceiver 202, communicating component 242, etc., can transmit the random access preamble during the RO (e.g., without receiving the SSB in the time division).

Similarly, in method 500, where it is determined that the time division is for receiving the SSB and for RO at Block 502, at Block 506, during the time division, the SSB can be transmitted and/or a random access preamble can be received in the RO. In an aspect, FD configuring component 352, e.g., in conjunction with processor(s) 312, memory 316, transceiver 302, scheduling component 342, etc., can transmit the SSB and/or receive the random access preamble in the RO during the time division. In an aspect, FD configuring component 352 can transmit (or configure resources for transmission of) the SSB and can receive (and/or configure the RO for receiving) the random access preamble using FD communications. In another aspect, only one of the SSB transmission or the RO may be configured in the time division (though the time division may be indicated or otherwise determined as for receiving SSB and RO), in which case FD configuring component 352 may transmit the SSB or receive the random access preamble, but not both.

In an aspect, in transmitting the SSB and/or receiving the random access preamble at Block 506, optionally at Block 508, it can be determined whether a SSB is configured in the time division. In an aspect, FD configuring component 352, e.g., in conjunction with processor(s) 312, memory 316, transceiver 302, scheduling component 342, etc., can determine whether the SSB is configured in the time division. In an aspect, FD configuring component 352 can determine whether it configured SSB transmission in the time division, as described above.

Where there is a SSB configured in the time division at Block 508, optionally at Block 510, it can be determined whether there is a RO configured in the time division. In an aspect, FD configuring component 352, e.g., in conjunction with processor(s) 312, memory 316, transceiver 302, scheduling component 342, etc., can determine whether the RO is configured in the time division. In an aspect, FD configuring component 352 can determine whether it configured the RO in the time division, as described. In another aspect, determining whether the RO is configured can include FD configuring component 352 determining whether a random access preamble is received during the RO.

Where there is a RO configured in the time division at Block 510, optionally at Block 512, the random access preamble can be received during the RO and the SSB can be transmitted in the time division. In an aspect, FD configuring component 352, e.g., in conjunction with processor(s) 312, memory 316, transceiver 302, scheduling component 342, etc., can receive the random access preamble during the RO and transmit, or schedule transmission of, the SSB in the time division (e.g., using FD communications).

Where there is not a RO configured in the time division at Block 510, optionally at Block 514, the SSB can be transmitted in the time division. In an aspect, FD configuring component 352, e.g., in conjunction with processor(s) 312, memory 316, transceiver 302, scheduling component 342, etc., can transmit, or schedule transmission of, the SSB in the time division without receiving the random access preamble.

Where there is not a SSB configured in the time division at Block 508, optionally at Block 516, it can be determined whether there is a RO configured in the time division. In an aspect, FD configuring component 352, e.g., in conjunction with processor(s) 312, memory 316, transceiver 302, scheduling component 342, etc., can determine whether the RO is configured in the time division. In an aspect, FD configuring component 352 can determine whether it configured the RO in the time division, as described. In another aspect, determining whether the RO is configured can include FD configuring component 352 determining whether a random access preamble is received during the RO.

Where there is a RO configured in the time division at Block 516, optionally at Block 518, the random access preamble can be received during the RO. In an aspect, FD configuring component 352, e.g., in conjunction with processor(s) 312, memory 316, transceiver 302, scheduling component 342, etc., can receive the random access preamble during the RO (e.g., without transmitting the SSB in the time division).

Figure 6:
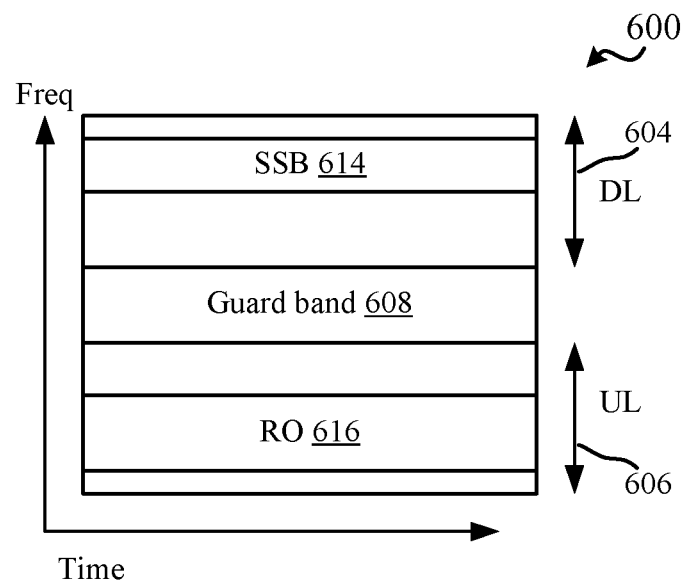
FIG. 6 illustrates an aspect of a time division for integrated SSB and random access occasion (RO), in accordance with various aspects of the present disclosure.
Figure 6:
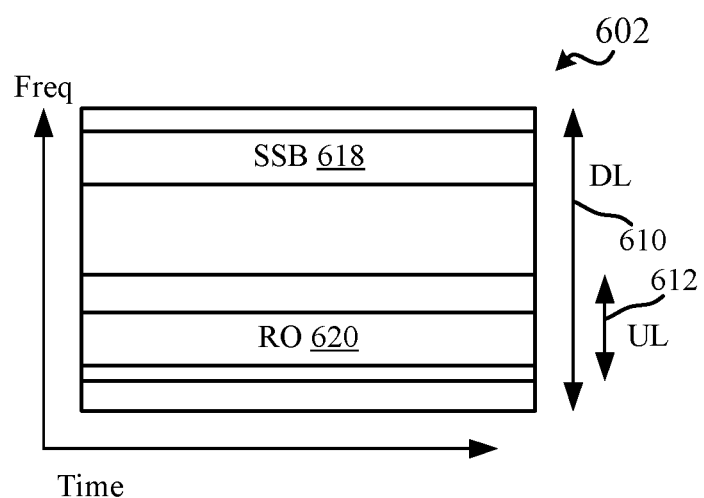

FIG. 6 illustrates aspects of a time division for SSB and RO communications. In FIG. 6, a time division 600 is shown for sub-band FD communications, including a downlink frequency portion 604 and an uplink frequency portion 606 separated by a guard band 608. Another time division 602 is shown for IBFD communications, including a downlink frequency portion 610 and an overlapping uplink frequency portion 612 (which is shown as fully overlapping the downlink frequency portion 610 but could be partially overlapping in frequency and/or time for IBFD communications). In time division 600, a SSB 614 can be transmitted in the downlink frequency portion 604 and a RO 616 can be configured for possible transmission of a random access preamble during the RO 616 (and/or concurrently with the SSB 614 transmission). Similarly, in time division 602, a SSB 618 can be transmitted in the downlink frequency portion 610 and a RO 620 can be configured for possible transmission of a random access preamble during the RO 620 (and/or concurrently with the SSB 618 transmission) in uplink frequency portion 612.

In some aspects (and/or in some time divisions), only one of the SSB or the random access preamble may actually be communicated, whereas in other aspects (and/or in other time divisions) both the SSB and the random access preamble (or neither one) can be communicated. In an aspect, the base station 102 may schedule the SSB and ROs with different periodicities, though each time division, or a subset of time divisions, for SSB can also support RO and/or vice versa. In these aspects, the time division can still be determined or otherwise indicated as supporting both SSB transmission and random access preamble (or other random access message) transmission during a RO in FD communications. Said differently, integrated SSB/RO time division(s) (e.g., symbol(s), slot(s), subframe(s)) can be defined for SSB and PRACH in FD communication. SS/PBCH blocks (SSB) and RACH occasions (RO) can possibly share the same time resources at different frequency resources (e.g., where both SSB and PRACH are communicated in the time division), and one or more of sub-band and/or IBFD allocation can be supported.

Figure 7:
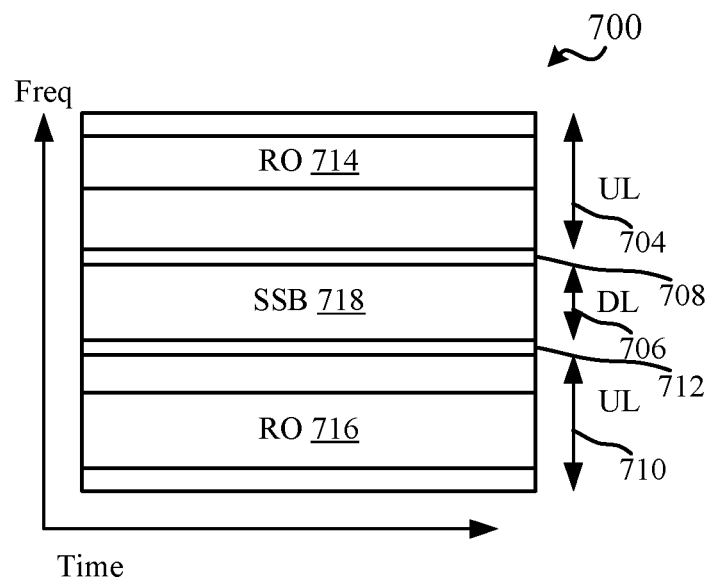
FIG. 7 illustrates an aspect of a time division for a physical random access channel (PRACH) dominate integrated SSB and random access occasion (RO), in accordance with various aspects of the present disclosure.
Figure 7:
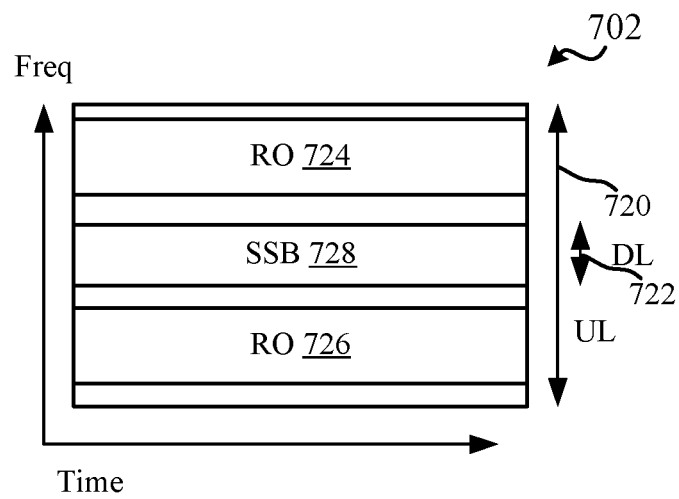

FIG. 7 illustrates additional aspects of a time division for SSB and RO communications. In FIG. 7, a time division 700 is shown for sub-band FD communications, including an uplink frequency portion 704 and a downlink frequency portion 706 separated by a guard band 708, and also another uplink frequency portion 710 separated from the downlink frequency portion 706 by another guard band 712. Another time division 702 is shown for IBFD communications, including an uplink frequency portion 720 and an overlapping downlink frequency portion 722 (which is shown as fully overlapping the uplink frequency portion 720 but could be partially overlapping in frequency and/or time for IBFD communications). In time division 700, an RO 714 can be configured in the uplink frequency portion 704 possible transmission of a random access preamble during the RO 714, and another RO 716 (or additional resources for the same RO) can be configured in uplink frequency portion 710. In addition, transmission of an SSB 718 can be configured in downlink frequency portion 706 (e.g., for concurrent transmission with random access preamble(s) in RO(s) 714 and/or 716 or otherwise). Similarly, in time division 702, a RO 724 can be configured for possible transmission of a random access preamble during the RO 724 in a part of uplink frequency portion 720 and another RO 726 can be configured for possible transmission of the random access preamble (or another random access preamble) in another part of uplink frequency portion 720. Additionally, a SSB 728 can be transmitted in the downlink frequency portion 722. In an aspect, the RO 724 is configured in a first part of the uplink frequency portion 720 that is before the downlink frequency portion 722 and the RO 726 is configured in a second part of the uplink frequency portion 720 that is after the downlink frequency portion 722.

In some aspects (and/or in some time divisions), only one of the SSB or the random access preamble(s) may actually be communicated, whereas in other aspects (and/or in other time divisions) both the SSB and the random access preamble(s) (or neither) can be communicated. In an aspect, the base station 102 may schedule the SSB and ROs with different periodicities, though each time division, or a subset of time divisions, for SSB can also support RO and/or vice versa. In these aspects, the time division can still be determined or otherwise indicated as supporting both SSB transmission and random access preamble (or other random access message) transmission during a RO in FD communications. In addition, a time division having multiple PRACHs transmitted in multiple ROs and one (or a less number of SSBs) can be said to be PRACH dominated integrated SSB/RO time divisions.

Figure 8:
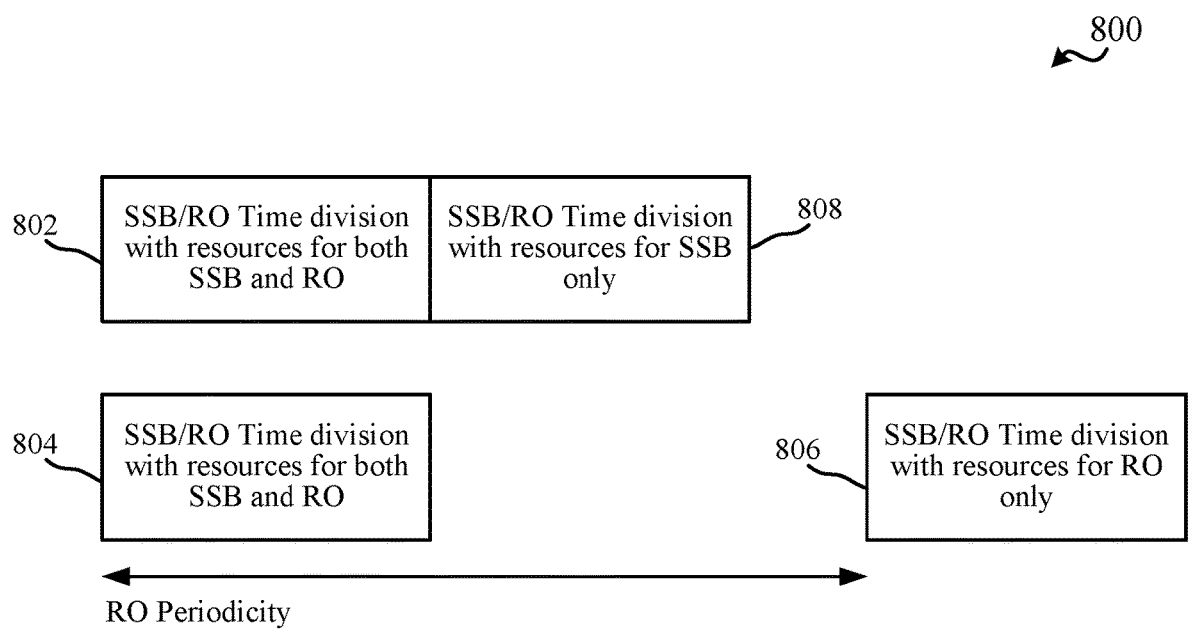
FIG. 8 illustrates an aspect of a resource allocation of different time divisions, in accordance with various aspects of the present disclosure.

FIG. 8 illustrates an aspect of a resource allocation 800 having time divisions configured for SSB and RO where at least in some time divisions, only one of the SSB or RO are transmitted. In an aspect, to accommodate different SSB periodicity and RO periodicity configuration as well as the actual number of SSBs and/or ROs, in FD communication system, some integrated SSB/RO time divisions can contain both SSB resources and RO resources, while some other integrated SSB/RO time divisions can contain either SSB resources or RO resources. In resource allocation 800, time divisions for SSB and RO (also referred to herein as integrated SSB/RO time divisions) 802, 804 are shown. After an RO periodicity, a time division for SSB and RO 806 is shown with resources only for RO after an RO periodicity. In this time division 806, SSB may not be transmitted (e.g., as the SSB periodicity may not have been satisfied at this time, or the base station 102 otherwise determines not to transmit SSB). In addition, before time division 806, another time division for SSB and RO 808 is shown with resources for SSB only (e.g., as the RO periodicity is not yet satisfied).

In an aspect, receiving the SSB and/or transmitting the random access preamble at Block 406 (and similarly transmitting the SSB and/or receiving the random access preamble at Block 506), as described above, can be based on the resource allocation, such as resource allocation 800, and/or whether the SSB and RO resources are both configured in a time division that is determined to support SSB and RO. Moreover, in an aspect, receiving the SSB and/or transmitting the random access preamble at Block 406 (and similarly transmitting the SSB and/or receiving the random access preamble at Block 506), as described above, can be over resources allocated for sub-band or IBFD communications, as shown in the aspects in FIGS. 6-7 above (e.g., in a time division with one SSB and one RO, in a PRACH dominated time division, etc.). In addition, in an aspect, SSB and RO resources may not span over all available frequency resources within duration of the integrated SSB/RO time divisions. Thus, in an aspect, the remaining frequency resources may be used to transmit/receive other signals or may not be used for such purposes.

In method 400, optionally at Block 420, transmitting other signals during the time division can be refrained from. In an aspect, FD determining component 252, e.g., in conjunction with processor(s) 212, memory 216, transceiver 202, communicating component 242, etc., can refrain from (and/or determine to refrain from) transmitting other signals during the time division, which can be based on determining that the time division is for receiving SSB and for RO, as described above.

Similarly, in method 500, optionally at Block 520, transmitting other signals during the time division can be refrained from. In an aspect, FD configuring component 352, e.g., in conjunction with processor(s) 312, memory 316, transceiver 302, scheduling component 342, etc., can refrain from (and/or determine to refrain from) transmitting and/or scheduling other signals during the time division, which can be based on determining that the time division is for receiving SSB and for RO, as described above.

In another aspect, in method 400, optionally at Block 422, other signals can be transmitted during the time division. In an aspect, FD determining component 252, e.g., in conjunction with processor(s) 212, memory 216, transceiver 202, communicating component 242, etc., can transmit other signals during the time division (e.g., along with the random access preamble and in different frequency resources in an uplink frequency portion of the frequency band or CC). In an aspect, FD determining component 252 can transmit the other signals subject to some constraints. In an aspect, FD determining component 252 can use the same numerology for transmitting the other signals as is used for transmitting the random access preamble during the RO.

Similarly, in method 500, optionally at Block 522, other signals can be received during the time division. In an aspect, FD configuring component 352, e.g., in conjunction with processor(s) 312, memory 316, transceiver 302, scheduling component 342, etc., can receive other signals during the time division (e.g., along with the random access preamble and in different frequency resources in an uplink frequency portion of the frequency band or CC). In an aspect, FD configuring component 352 can receive the other signals subject to some constraints. In an aspect, FD configuring component 352 can receive the other signals with the same numerology as used for receiving the random access preamble during the RO.

In another aspect, in method 400, optionally at Block 424, other signals can be received during the time division. In an aspect, FD determining component 252, e.g., in conjunction with processor(s) 212, memory 216, transceiver 202, communicating component 242, etc., can receive other signals during the time division (e.g., along with the SSB and in different frequency resources in a downlink frequency portion of the frequency band or CC). In an aspect, FD determining component 252 can receive the other signals subject to some constraints. In an aspect, FD determining component 252 can receive the signals having the same numerology as is used for the SSB.

Similarly, in method 500, optionally at Block 524, other signals can be transmitting during the time division. In an aspect, FD configuring component 352, e.g., in conjunction with processor(s) 312, memory 316, transceiver 302, scheduling component 342, etc., can transmit other signals during the time division (e.g., along with the SSB and in different frequency resources in a downlink frequency portion of the frequency band or CC). In an aspect, FD configuring component 352 can transmit the other signals subject to some constraints. In an aspect, FD configuring component 352 can use the same numerology for transmitting the other signals as is used for transmitting the SSB.

In another aspect, in method 400, optionally at Block 426, other signals having a same or different numerology can be transmitted in a subsequent time division. In an aspect, FD determining component 252, e.g., in conjunction with processor(s) 212, memory 216, transceiver 202, communicating component 242, etc., can transmit other signals in a subsequent time division (e.g., a time division that is not for SSB and for RO) having a same or different numerology as the random access preamble (transmitted in the time division that is for SSB and for RO). In an aspect, FD determining component 252 can transmit the other signals in subsequent time divisions without the constraints used where the other signals are transmitted in the same time division that is for SSB and for RO.

Similarly, in method 500, optionally at Block 526, other signals having a same or different numerology can be received in a subsequent time division. In an aspect, FD configuring component 352, e.g., in conjunction with processor(s) 312, memory 316, transceiver 302, scheduling component 342, etc., can receive other signals in a subsequent time division (e.g., a time division that is not for SSB and for RO) having a same or different numerology as the random access preamble (received in the time division that is for SSB and for RO). In an aspect, FD configuring component 352 can receive the other signals in subsequent time divisions without the constraints used where the other signals are received in the same time division that is for SSB and for RO.

In another aspect, in method 400, optionally at Block 428, other signals having a same or different numerology can be received in a subsequent time division. In an aspect, FD determining component 252, e.g., in conjunction with processor(s) 212, memory 216, transceiver 202, communicating component 242, etc., can receive other signals in a subsequent time division (e.g., a time division that is not for SSB and for RO) having a same or different numerology as the SSB (received in the time division that is for SSB and for RO). In an aspect, FD determining component 252 can receive the other signals in subsequent time divisions without the constraints used where the other signals are received in the same time division that is for SSB and for RO.

Similarly, in method 500, optionally at Block 528, other signals having a same or different numerology can be transmitted in a subsequent time division. In an aspect, FD configuring component 352, e.g., in conjunction with processor(s) 312, memory 316, transceiver 302, scheduling component 342, etc., can transmit other signals in a subsequent time division (e.g., a time division that is not for SSB and for RO) having a same or different numerology as the SSB (transmitted in the time division that is for SSB and for RO). In an aspect, FD configuring component 352 can transmit the other signals in subsequent time divisions without the constraints used where the other signals are transmitted in the same time division that is for SSB and for RO.

In method 400, where it is determined that the time division is not for receiving a SSB and for RO, at Block 402, optionally, at Block 430, communications can occur during the time division, which may not include SSB or RO communications (or may include SSB or RO but not both). In an aspect, FD determining component 252, e.g., in conjunction with processor(s) 212, memory 216, transceiver 202, communicating component 242, etc., can communicate (or determine to communicate) in the time division in this regard (e.g., to include communications other than SSB and RO, or to include one of SSB or RO).

Similarly, in method 500, where it is determined that the time division is not for receiving a SSB and for RO, at Block 502, optionally, at Block 530, communications can occur during the time division, which may not include SSB or RO communications (or may include SSB or RO but not both). In an aspect, FD configuring component 352, e.g., in conjunction with processor(s) 312, memory 316, transceiver 302, scheduling component 342, etc., can communicate (or determine to communicate) in the time division in this regard (e.g., to include communications other than SSB and RO, or to include one of SSB or RO).

Figure 9:
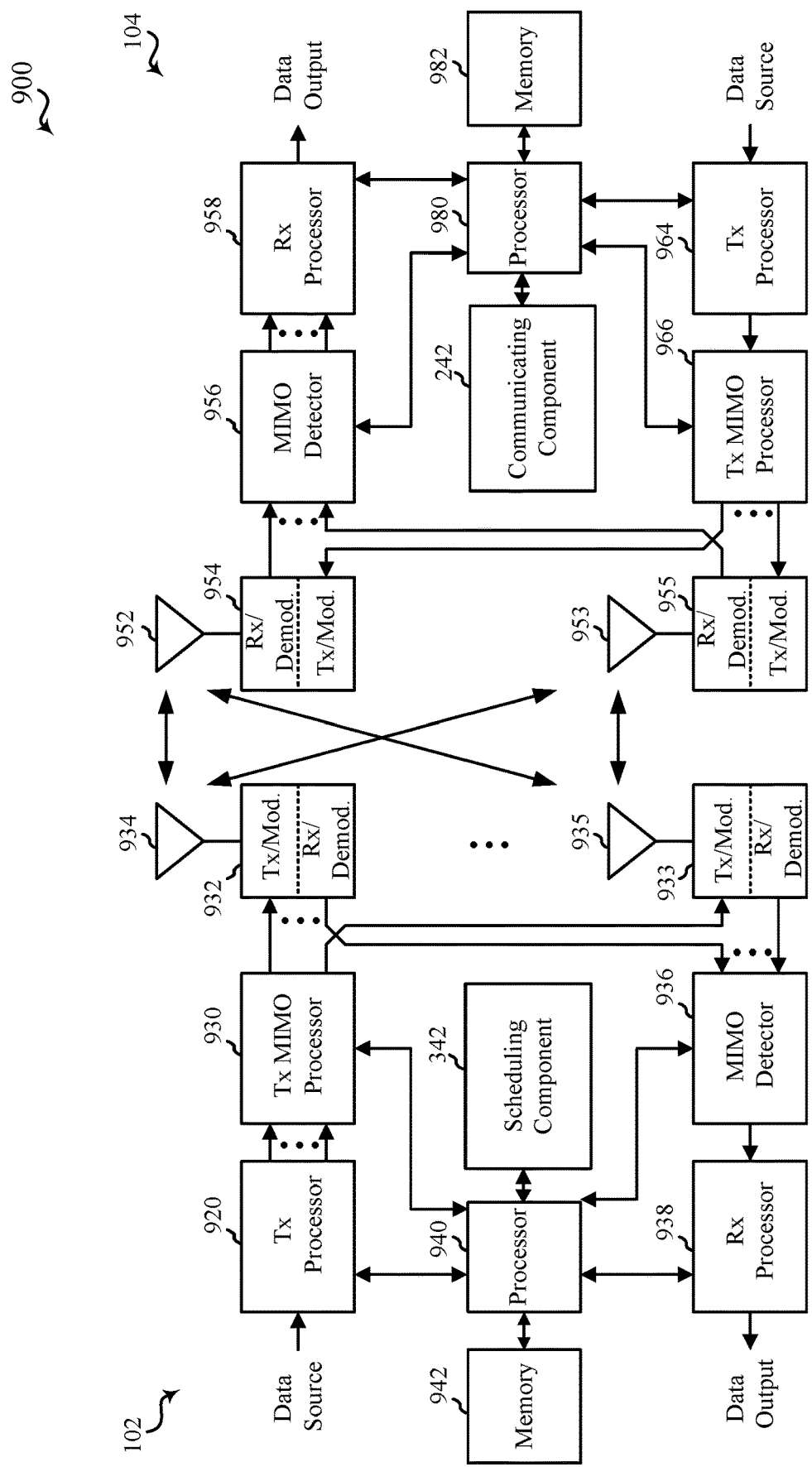
FIG. 9 is a block diagram illustrating an aspect of a MIMO communication system including a base station and a UE, in accordance with various aspects of the present disclosure.

FIG. 9 is a block diagram of a MIMO communication system 900 including a base station 102 and a UE 104, in accordance with various aspects of the present disclosure. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory; and
one or more processors communicatively coupled with the transceiver and the memory, wherein the one or more processors are configured to:
receive, via the transceiver, an indication that a time division is for receiving a synchronization signal block (SSB) and for a random access occasion (RO) for transmitting a random access preamble in full duplex (FD) communications;
receive, via the transceiver, the SSB during the time division in accordance with the indication; and
transmit, via the transceiver, the random access preamble in the RO during the time division in accordance with the indication.

2. The apparatus of claim 1, wherein the one or more processors are configured to receive, via the transceiver, the SSB in a downlink frequency portion of a component carrier (CC) and transmit, via the transceiver, the random access preamble in an uplink frequency portion of the CC simultaneously during the time division.

3. The apparatus of claim 2, wherein the downlink frequency portion and the uplink frequency portion at least partially overlap in frequency.

4. The apparatus of claim 2, wherein the downlink frequency portion and the uplink frequency portion in the same CC are separated by a guard band in frequency.

5. The apparatus of claim 2, wherein the uplink frequency portion is separated from the downlink frequency portion by a guard band in frequency.

6. The apparatus of claim 2, wherein the downlink frequency portion is within the uplink frequency portion, and wherein the RO is configured in a first part of the uplink frequency portion that is before the downlink frequency portion and a second part of the uplink frequency portion that is after the downlink frequency portion.

7. The apparatus of claim 1, wherein the SSB and the RO are frequency division multiplexed in the time division.

8. The apparatus of claim 1, wherein the time division is an orthogonal frequency division multiplexing (OFDM) symbol, multiple OFDM symbols, one or more slots, or one or more sub-frames.

9. The apparatus of claim 1, wherein the one or more processors are further configured to determine that the time division is for receiving the SSB and for the RO based on one or more parameters related to the time division.

10. The apparatus of claim 9, wherein the one or more parameters include a subframe number.

11. The apparatus of claim 1, wherein the one or more processors are further configured to refrain from transmitting other signals during the time division.

12. The apparatus of claim 1, wherein the one or more processors are further configured to transmit, via the transceiver, other signals during the time division, wherein the other signals have a same numerology as the random access preamble.

13. The apparatus of claim 1, wherein the one or more processors are further configured to receive, via the transceiver, other signals during the time division, wherein the other signals have a same numerology as the SSB.

14. The apparatus of claim 1, wherein the one or more processors are further configured to transmit, via the transceiver, other signals during a subsequent time division, wherein the other signals have a different numerology than the random access preamble.

15. The apparatus of claim 1, wherein the one or more processors are further configured to receive, via the transceiver, other signals during a subsequent time division, wherein the other signals have a different numerology than the SSB.

16. A method of wireless communication, comprising:
receiving an indication that a time division is for receiving a synchronization signal block (SSB) and for a random access occasion (RO) for transmitting a random access preamble in full duplex (FD) communications;
receiving the SSB during the time division in accordance with the indication; and
transmitting the random access preamble in the RO during the time division in accordance with the indication.

17. The method of claim 16, wherein receiving the SSB includes receiving the SSB in a downlink frequency portion of a component carrier (CC) and transmitting the random access preamble includes transmitting the random access preamble in an uplink frequency portion of the CC simultaneously during the time division.

18. The method of claim 17, wherein the downlink frequency portion and the uplink frequency portion at least partially overlap in frequency.

19. The method of claim 17, wherein the downlink frequency portion and the uplink frequency portion in the same CC are separated by a guard band in frequency.

20. The method of claim 17, wherein the uplink frequency portion is separated from the downlink frequency portion by a guard band in frequency.

21. The method of claim 17, wherein the downlink frequency portion is within the uplink frequency portion, and wherein the RO is configured in a first part of the uplink frequency portion that is before the downlink frequency portion and a second part of the uplink frequency portion that is after the downlink frequency portion.

22. The method of claim 16, wherein the SSB and the RO are frequency division multiplexed in the time division.

23. The method of claim 16, wherein the time division is an orthogonal frequency division multiplexing (OFDM) symbol, multiple OFDM symbols, one or more slots, or one or more sub-frames.

24. The method of claim 16, further comprising determining that the time division is for receiving the SSB and for the RO based on one or more parameters related to the time division.

25. The method of claim 24, wherein the one or more parameters include a subframe number.

26. An apparatus for wireless communication, comprising:
means for receiving an indication that a time division is for receiving a synchronization signal block (SSB) and for a random access occasion (RO) for transmitting a random access preamble in full duplex (FD) communications;
means for receiving the SSB during the time division in accordance with the indication; and
means for transmitting the random access preamble in the RO during the time division in accordance with the indication.

27. A non-transitory computer-readable medium comprising code stored thereon that, when executed by an apparatus, causes the apparatus to:
receive an indication that a time division is for receiving a synchronization signal block (SSB) and for a random access occasion (RO) for transmitting a random access preamble in full duplex (FD) communications;
receive the SSB during the time division in accordance with the indication; and
transmit the random access preamble in the RO during the time division in accordance with the indication.

28. The method of claim 16, further comprising refraining from transmitting other signals during the time division.

* * * * *